United States Patent [19]
Redding

[11] Patent Number: 4,943,780
[45] Date of Patent: Jul. 24, 1990

[54] MULTI-LAYER SHEET STRUCTURE, METHOD OF MAKING SAME AND CONTAINERS MADE THEREFROM

[75] Inventor: Dwight D. Redding, Appleton, Wis.

[73] Assignee: American National Can Company, Chicago, Ill.

[21] Appl. No.: 38,605

[22] Filed: Apr. 15, 1987

Related U.S. Application Data

[60] Division of Ser. No. 657,003, Oct. 2, 1984, Pat. No. 4,659,408, which is a continuation-in-part of Ser. No. 614,878, May 29, 1984, abandoned, which is a continuation-in-part of Ser. No. 482,350, Apr. 5, 1983, abandoned.

[51] Int. Cl.$^5$ .......................... B32B 1/08; B32B 15/08
[52] U.S. Cl. ................................. 428/35.9; 428/215; 428/463; 428/513; 428/515; 428/520; 428/910
[58] Field of Search ............... 428/35, 36, 215, 515, 428/520, 513, 463, 910, 35.9; 222/106, 107

[56] References Cited

U.S. PATENT DOCUMENTS

| | | | |
|---|---|---|---|
| 4,147,291 | 4/1979 | Akao et al. | 428/910 |
| 4,209,126 | 6/1980 | Elias | 428/910 |
| 4,418,841 | 12/1983 | Eckstein | 222/107 |
| 4,539,259 | 9/1985 | Zuscik | 428/332 |
| 4,659,408 | 4/1987 | Redding | 428/36 |

*Primary Examiner*—Alexander S. Thomas
*Attorney, Agent, or Firm*—Robert A. Stenzel

[57] ABSTRACT

A multi-layer paperless sheet structure having an oriented substructure is provided for making tubular containers for packaging dentifrice and other products. The sheet structure comprises a unique combination of polymer layers, including a uniaxially oriented polymer (polypropylene or high density polyethylene) layer. The sheet structure has two exterior heat sealable surfaces for forming the tubular containers by lap heat seal and the resulting containers exhibit improved strength and deadfold retention properties. A method is also provided for forming the sheet structure with its oriented substructure.

33 Claims, 3 Drawing Sheets

MULTI-LAYER SHEET STRUCTURE, METHOD OF MAKING SAME AND CONTAINERS MADE THEREFROM

This a Division of application Ser. No. 657,003 filed Oct. 2, 1984 U.S. Pat. No. 4,659,408, which is a continuation-in-part of application Ser. No. 614,878 filed May 29,1984 abandoned, which is a continuation-in-part of S.N. 482,350 filed Apr. 5,1983 abanboned.

FIELD OF THE INVENTION

The present invention generally relates to multi-layer flexible sheet structures and to containers made therefrom. In one aspect, this invention is concerned with a paperless multi-layer flexible sheet structure, including an oriented substructure, for use in making flexible tubes of the tupe commonly employed for packaging and dispensing paste-type products. In other aspects this invention is directed to much multi-layer sheet structures, including a uniaxially oriented substructure, and to containers and tubes made therefrom.

BACKGROUND OF THE INVENTION

Metal foils have long been used for making containers and tubes for packaging and dispensing various products, including paste-type prouducts. Such containers and tubes have frequently been made from a single foil layer. However, containers and tubes made from metal foil have has several disadvantages compared to containers made of plastic. Metal tubes tend to dent and deform more readily, crack with a moderate amount of flexure and they are more expensive.

More recently, a large share of the tube market has been taken by flexible sheet structure materials having a multiplicity of polymeric layers. Typically, such tubes have an inner heat sealable layer, an outer heat sealable layer, and a barrier layer interposed therebetween. Additional layers may be used in conventional structures to provide other properties or qualities.

Layers of a non-polymeric nature, such as paper and thin metal foils, may also be included in these sheet materials to provide specialized performance functions. It is known, for example, to provide a layer of thin aluminum foil as a high quality barrier layer. When foil is used, it is common practice to use a highly adherent polymer to adhere the foil to its adjacent layers. While such structures have had some success in the commercial market place, they have exhibited certain disadvantages which have limited their use.

Certain products are particularly hard to hold because of their chemical activity in attacking the inner tube layers and particularly the aluminum foil layer. This problem has been addressed by using chemically-resistant polymers as the tube interior layer to protect the foil. In order to alleviate this problem, commonly assigned, copending application Ser. No. 306,675 discloses the Use of Linear low density polyethylene as the inner sealant layer of the tube.

It is also known to provide a layer of paper for impairing dimensional stability, which is particularly important for printing, and which also provides an aesthetically pleasing and aseptically cleann appearing white background. The inclusion of a paper layer also improves the deadfold retention properties of the tube.

Tube failure is generally attributed to their rough handling during shipment, as a result of which the tube sidewall splits, allowing the contents to ooze out. It has been observed that the paper layer in the laminate is the weakest part of the structure, and once it begins to fail, the entire tube is weakened and breaks The ability of a tube to withstand rough handling is related to its ability to withstand "drop test", hereinafter also described as "tube drop test", in which a tube filled with product is repeatedly dropped until it fails. All tubes shipped in commerce may be expected to be subjected to rough handling, essentially independent of the product contained therein, and are thus subject to handling stresses as encountered in the tube drop test. Economical construction of tubes which are consistently capable of passing the tube drop test has remained a problem. This problem has been addressed by using a reinforcing layer of a biaxially oriented polypropylene in the interior of the sheet structure, as descrebed in said commonly assigned copending application Ser. No. 306,675. The structure disclosed in said copending application, however, contains paper, and while certain improvements in strength are realized in such structures, it is desirable to provide other structures which afford the dimensional stability and economy of such paper-containing structures, and which also have increased strength and other improved attributes.

Improvement in preventing chemical attack by the product in the container is described in another commonly assigned copending application Ser. No. 340,468, in which a polyacrylic acid chrome complex primer is used between the foil and the ethylene acrylic acid copolymer on the sealant side of the foil.

It is therefore an object of the present invention to provide a dimensionally stable multi-layer structure without a paper layer.

It is further object of this invention to provide such paper-free, multi-layer laminates for making tubes which are resistant to chemical attack by products of the type packaged in dispensing containers.

It is also an object of this invention to provide containers and tubes having acceptable deadfold and crease retention properties.

The foregoing and other advantages and features of the invention will be more fully appreciated from the ensuing detailed description and the accompanying drawings.

SUMMARY OF THE INVENTION

The foregoing objects and advantages of the present invention are realized by providing a unique multi-layer laminate sheet structure, including an oriented substructure, which can be formed into containers and tubes for packaging various products, Due to the uniqueness of this multi-layer laminate structure, the resulting containers are resistant to chemical attack by the packaged ingredients, exhibit acceptable deadfold crease retention properties and can withstand rough handling during shipment without failure due to cracks.

In one embodiment of the invention, the sheet structure comprises, in order, a first heat sealable layer on a first one of two exterior surfaces, a first adhesive layer of ethylene acrylic acid copolymer, and a layer of metal foil. A second adhesive layer of ethylene-acrylic acid copolymer adheres the foil to a first layer of polyethylene or ethylene copolymer. On the opposing surface of the first polyethylene layer is a second layer of polyethylene or ethylene copolymer. The second polyethylene layer is adhered through a first primer to a layer of uniaxially oriented polypropylene having an orientation ratio between about 2/1 and about 6/1, A third adhesive layer adheres the polypropylene layer to a second heat sealable layer on the second exterior surface of the sheet material. Significantly, the polypropylene layer is within about 1 to about 1.5 mil of the second exterior surface of the sheet structure.

In a preferred structure of this invention, the second heat sealable layer, the third adhesive layer, and the polypropylene layer, and produced by coextrusion as a three-layer film substructure, and unixially oriented simultaneously, the orientation ratio being between about 2/1 and about 6/1.

In order that the sheet material of the invention may be formed into a tubular container, the first and second heat sealable layers must be compatible for heat sealing to each other.

The invention also contemplates providing a flexible dispensing tube made of the multiple layer sheet structure hereinabove described, with the uniaxially-oriented layers disposed toward the exterior surface of the tube.

The invention also provides a method of making a multiple layer sheet material structure, which comprises first coextruding a three-layer film and uniaxially orienting the film at an orientation ratio of about 2/1 to about 6/1 to produce an oriented film substructure having three consecutive layers of low density polyethylene, ethylene-methyl acrylate copolymer, and polypropylene. The oriented film is corona treated on the external polypropylene surface, and the treated surface is then primed with polyethylene imine. A previously formed low density polyethylene film is then extrusion laminated to the treated and primed polypropylene layer, using low density polyethylene as the extrusion laminant. The previously formed low density polyethylene layer is then extrusion laminated to an aluminum foil layer using ethylene-acrylic acid copolymer as the extrusion laminant. Optionally, the exposed surface of the foil may be primed using a polyacrylic acid based primer.

The foil is finally coextrusion coated with a coextrudate of ethylene-acrylic acid copolymer and polythylene or linear low density polyethylene, with the ethylene-acrylic acid copolymer being coated onto the foil.

DETAILED DESCRIPTION OF THE INVENTION

Figure 1:
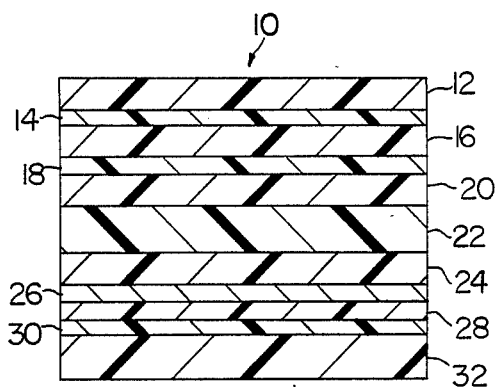
FIG. 1 is a cross-sectional view of a multi-layer sheet structure of a preferred embodiment of the invention.

Referring now to the drawings, and first to FIG. 1, the multilayer sheet structure is generally designated as 10. Layers 12 and 20 are both low density polyethylene (LDPE). Layer 22 is pigmented low density polyethylene. Layer 14 is ethylene-methyl acrylate (EMA) copolymer. Layer 16 is polypropylene (PP). Layer 18 is polyethylene imine (PEI) primer. Layers 24 and 30 are both ethylylene-acrylic acid (EAA) copolymer. Layer 26 is aluminum foil. Layer 28 is a polyacrylic acid chrome complex primer, and Layer 32 is linear low density polyethylene (LLDPE). Thus, the multi-layer sheet structure shown in FIG. 1 does not contain paper.

In order to realize the advantages of this invention, the polypropylene Layer 16 must be uniaxially oriented, with an orientation ratio of from about 2/1 to about 6/1. Additionally, it has been found that unexpected advantages can be realized when the uniaxially oriented polypropylene layer is within 0.2 mil to about 4 mils, preferably about 1 to about 1.5 mils of the surface of the sheet structure forming the outside of the tube.

In order to impart beneficial and highly desirable properties to containers made from the multi-layer sheet structures of this invention, it is important that the polypropylene layer be uniaxially oriented and that this layer be disposed at a certain distance from the outer surface of the container. Thus, the polypropylene Layer 16 is uniaxially oriented to the desired orientation ration and thereafter laminated, such as be extrustion lamination, to the LDPE Layer 12 using the EMA adhesive layer as the extrustion laminant to form a film substructure made of Layers 12, 14 and 16. Or, as it is often more convenient, the Layers 12, 14 and 16 are coextruded to form the film substructure of these three layers, and thereafter this film is uniaxially oriented to obtain the desired orientation ratio of the polypropylene layer.

Regardless of how the film substructure is formed, the polypropylene layer is corona treated and primed with PEI primer Layer 18 before extrustion laminating to the LDPE Layer 20 of the substructure made of the Layers 20, 22, 24, 26, 28 and 32. The latter substructure may also be found separately as a film which is then extrusion laminated to the film substructure of Layers 12, 14 and 16, using the PEI Layer 18 as the extrusion laminant, as aforesaid.

The advantages resulting from the inclusion of a uniaxially oriented polypropylene layer are realized both when this layer is oriented in the machine direction (MD) or cross-machine direction (CMD), i.e., at 90 degrees relative to the MD.

Whether of PP layer is oriented in the MD or CMD, in general, beneficial results are realized when the orientation ratio is from about 2:1 to about 6:1, preferably from about 3:1 to about 5:1.

While PP is the polymer of choice of Layer 16, this layer may, if desired, by replaced with oriented high density polyethylene (HDPE), a blend of PP and HDPE, or with nylon.

In addition to using a layer of uniaxially oriented PP, it is also important that this layer by within certain critical distance from the outer surface of the container. Thus, it has been found that most beneficial results are realized when the PP layer is disposed within about 0.2 to about 4 mils, preferably within about 1 to about 1.5 mils of the outer surface of the tube.

Also, while FIG. 1 depicts a film substructure of the Layers 12, 14 and 16, the present invention also contemplates a film substructure made of the PP Layer 16 and EMA Layer 14 without the LDPE Layer 12. In such film the PP Layer 16 is either coated with, or is extrusion laminated to the EMA Layer 14.

The inclusion of uniaxially oriented PP layer in the multilayer sheet structure of this invention as herein described imparts several highly advantageous properties to the tubes made of such structure. These advantages include greater stability for printing and withstanding subsequent processing operations; increased strength and, surprisingly, improved deadfold characteristics.

Figure 2:
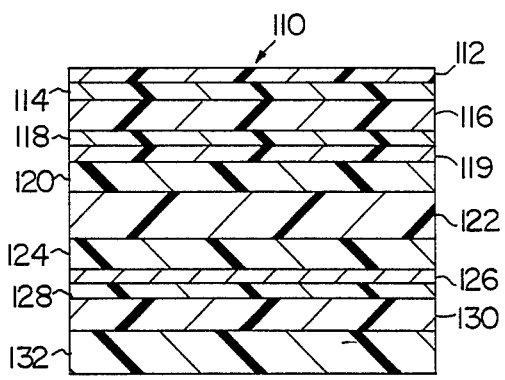
FIG. 2 is a cross-sectional view of a multi-layer sheet stucture in accordance with a different embodiment of the invention.

Referring now to FIG. 2, the overall sheet structure is generally designated as 110. The several layers in this sheet structure are designated by 100 series reference numerals corresponding to the two digit reference numerals of like layers serving the same of similar functions as the layers in FIG. 1. Thus, for example, Layers 12 and 112 are both LDPE serving as the outermost layers of their respective sheet structures, and they are heat sealable. Similar comparisons apply to the remaining layers of FIG. 2 except for Layers 114 and 119. Layer 114 is maleic anhydride modified polypropylene adhesive used instead of the EMA Layer 14 in FIG. 1, and Layer 119 is an ink layer or coating used for printing artwork on the PP layer.

Figure 3:
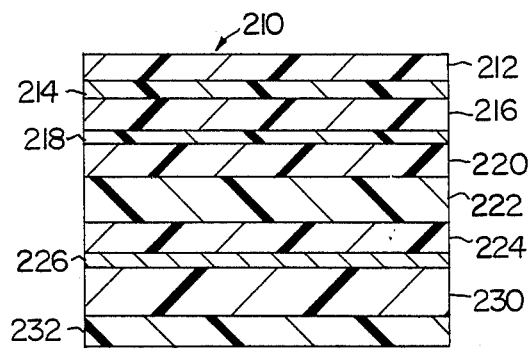
FIG. 3 is a cross-sectional view of a multi-layer sheet structure illustrating a further embodiment of the invention.

In FIG. 3, the overall sheet structure is designated as 210. The several layers in this figure are designated by 200 series corresponding to the two digit reference numerals of like layers serving the same or similar functions as the layers in FIG. 1. Thus, Layers 212, 214 and 216 represent, respectively, LDPE, EMA and PP forming a fim substructure as aforesaid. Layer 218 is PEI; Layers 220 and 232 are both LDPE; Layers 224 and 230 are both EMA; Layer 226 is aluminum foil; and Layer 232 is LDPE.

Figure 4:
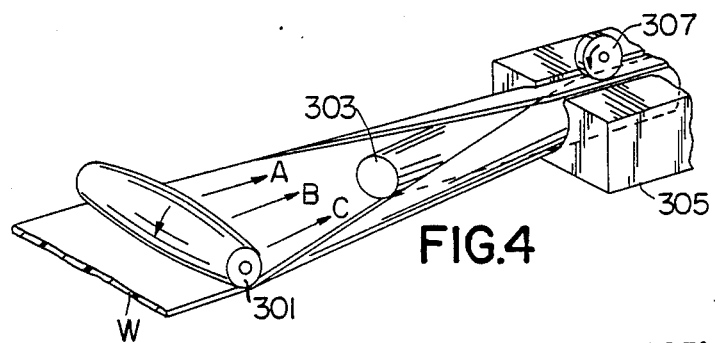
FIG. 4 is a perspective view of the tube forming assembly illustrating the manner of shaping a sheet structure into a tube wherein at least some of the layers of the sheet structures are oriented in the machine direction.

In order to form the tubular body of a typical dispensing container, referance may be had to FIG. 4 which shows an apparatus for continuously forming tubing from flat stock. Such apparatus is illustrated and described in commonly assigned U.S. Pat. No. 3,540,959, issued to J.H. Connor on Nov. 17, 1970, the disclosure of which is incorporated herein by reference. Thus, as shown in FIG. 4, the strip of the multi-layer sheet structure of the present invention, designated as W, is fed through a guide roller 301 onto a working piece or mandrel 303 which is enclosed in a shaping block 305. During its travel, the strip W is progressively folded around the mandrel 303 and joined together as a lap seam L by a heated pressure roller 307. The arrows A, B and C in FIG. 4 indicated the direction of orientation of the strip W, i.e., in the machine direction (MD).

Figure 5:
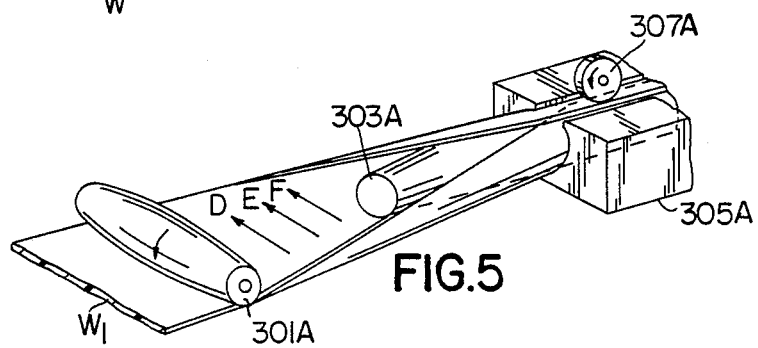
FIG. 5 is a view similar to FIG. 4, but wherein at least some of the layers of the multi-layer structure are oriented in the cross machine direction during tube forming operation.

FIG. 5 illustrates the method of forming tubing from a strip of the multi-layer sheet structure of the present invention, designated as W1, wherein the direction of orientation is in the cross machine direction (CMD). The apparatus employed in FIGS. 4 and 5 are otherwise the same and the various parts of the apparatus are designated with the same reference numeral followed by the reference letter A for simplicity.

In FIG. 5, the strip W1 is fed through the apparatus with its direction of orientation at about 90 degrees relative to the flow direction as shown by the arrows D, E and F. Hence, in the resulting tubing, the sheet structure will be oriented in the CMD.

Figure 6:
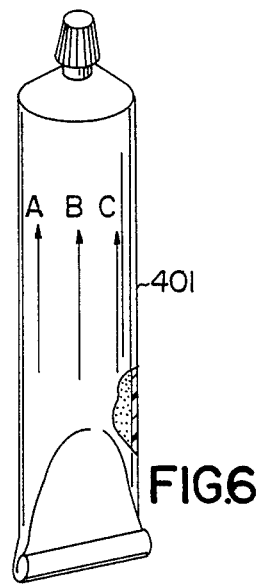
FIG. 6 is a partially cut-away view of a tube formed of a multi-layer sheet structure with orientation in the machine direction.
Figure 7:
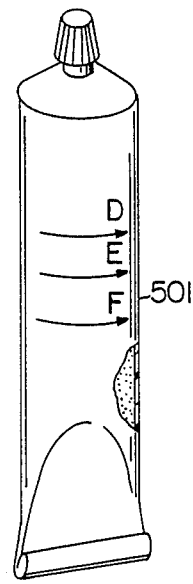
FIG. 7 is a view similar to FIG. 6, but with orientation in the cross machine direction.

FIGS. 6 and 7 illustrates tubualr containers, generally designated as 401 and 501, respectively. The arrows A, B and C in FIG. 6 and D, E and F in FIG. 7 shows the direction of orientation of the unaxially oriented layers in the structure.

In order to realized increased strength and improved deadfold retention properties in the multi-layer sheet structures, and in the containers made therefrom, the oriented PP layer must be disposed within about 0.2 to about 4 mils, preferably within about 1 to 1.5 mil of the surface of the sheet structure. Since Layer 12 functions as a heat seal layer in forming the lap seal on the tube sidewall, it should, as a practical matter, be sufficiently thick to consistently form a heat seal. Layer 14, then, should be as thin as possible while still fulfilling it adhesive function for adhering Layers 12 and 16 to each other. In practice, the Layer 12 is from about 0.8 mil to about 1.2 mils thick, and the Layer 14 is from about 0.2 to about 0.3 mils thick.

While PEI is shown as a Layer 18, it will be appreciated that, in its use as a primer, it is a thin coating and is shown as a layer for illustration purposes only. Likewise, Layer 28 is also applied as a thin coating even though it is shown as a layer for illustration. Layer 22 is usually a pre-forming film of pigmented white LDPE, and is typically about 2.75 to about 3.25 mils thick. Layer 20 (LDPE) is conventionally used an extrusion laminant to join Layers 22 and 16, and is typically about 1.0 mil thick.

Layer 24 is conventionally used an extrusion laminant to join Layer 22 to the foil of Layer 26. The foil is advantageously between about 0.25 and about 0.7 mil thick, depending on the anticipated product and its use. The foil may be extrusion coated directly with a relatively thick layer of about 2.0 mils of EAA and about 1.2 mils of LDPE as in FIG. 3. Alternatively, as in FIGS. 1 and 2, the foil may first be primed with polyacrylic acid chrome complex primer (Layers 28 and 128). With the foil thus primed, the primer provides a certain degree of resistance to chemical attack. In these structures, the thickness of the expensive EAA layer may be reduced to that required to perform its adhesive function, namely about 0.5 mil. The outer sealant layer of LLDPE is about 2.0 mils.

Tubes made with the sheet structures of this invention show improved strength in surviving drop tests described hereinafter. Suprisingly, they also show increased deadfold retention.

The following examples serve to illustrate the present invention.

EXAMPLE 1

LDPE, EMA, and PP are cast coextruded using three extruders feeding into a coextrusion die, and formed into a three-layer coextruded film. The coextruded film is uniaxially oriented at an orientation ratio of 3.2/1 to form an oriented three-layer substructure 2.0 mils thick, with the following thicknesses:
0.8 mil LDPE
0.2 mil EMA
1.0 mil PP The PP surface is corona treated and primed with PEI primer. The PP surface is then extrusion laminated to a previously formed 2.75 mil film of pigmented LDPE, using 1.0 mil LDPE as the extrusion laminant, to make a five-layer substructure excluding the primer.

The 2.75 mil LDPE surface layer is then extrusion laminated to a 0.7 mil aluminum foil, using 1.0 mil EAA as the extrusion laminant. The opposite side of the foil is then primed with polyacrylic acid chrome complex primer and coextrusion coated with 0.5 mil EAA and 2.05 mils LLDPE, with the EAA against the foil, and the LLDPE layer forming the second outer surface the completed sheet structure. The first outer surface is the LDPE in the unaxially oriented three-layer substructure.

EXAMPLE 2

Another sheet structure is made using the same method and materials as in Example 1, but with some different layer thicknesses. The three-layer oriented substructure is 2.5 mils thick, as follows:
1.2 mils LDPE
0.3 mil EMA
1.0 mil PP The other differences are using 0.25 mil foil and 2.0 mil LLDPE.

EXAMPLE 3

Another sheet structure is made as in Example 2 using the same method and materials, except that the three-layer oriented substructure is two mils thick, as follows:
0.8 mil LDPE
0.2 mil Admer
1.0 mil PP Admer is maleic anhydride modified polypropylene-based adhesive polymer. After the PP layer is corona treated and primer, it is printed with ink before being extrusion laminated to the LDPE layer, which in this case is 3.25 mils thick.

EXAMPLE 4

Another sheet structure is made as in Example 3 using the same method and materials, except that in the three-layer oriented substructure, 0.2 mil EMA is substituted for 0.2 mil Admer and the ink is omitted: The extrusion laminant LDPE layer corresponding to Layer 220 in FIG. 3 is 0.8 mil. The polyacrylic acid chrome complex primer is omitted; and the final three layers are:
0.25 mil foil
2.0 mils EAA
1.2 mils LDPE Table 1 shows the complete structures of Examples 1-4 along with structures of comparative Examples A, B and C which are not within the scope of this invention. Comparative Example A is paperless, but does not contain a uniaxially oriented layer. Comparative Example B contains a uniaxially oriented PP layer, but it is substantially farther than 1.5 mils from the surface of the sheet structure. Comparative Example C is a conventional sheet structure used commercially to make toothpaste tubes.

TABLE 1

| EX. 1 | EX. 2 |
|---|---|
| 0.3 mil LDPE* | 1.2 mil LDPE* |
| 0.2 mil EMA* | 0.3 mil EMA* |
| 1.0 mil PP* | 1.0 mil PP* |
| Primer | Primer |
| 1.0 mil LDPE | 1.0 mil LDPE |
| 2.75 mils white LDPE | 2.75 mils white LDPE |
| 1.0 mil EAA | 1.0 mil EAA |
| 0.7 mil foil | 0.25 mil foil |
| Primer | Primer |
| 0.5 mil EAA | 0.5 mil EAA |
| 2.05 mils LLDPE | 2.0 mils LLDPE |
| 10.0 mils Total | 10.0 mils Total |

TABLE 1-continued

| EX. 3 | EX. 4 |
|---|---|
| 0.8 mil LDPE* | 0.8 mil LDPE* |
| 0.2 mil Admer* | 0.2 mil EMA* |
| 1.0 mil PP* | 1.0 mil PP* |
| Primer | Primer |
| Ink | 0.8 mil LDPE |
| 1.0 mil LDPE | 3.25 mils white LDPE |
| 3.25 mils white LDPE | 1.0 mil EAA |
| 1.0 mil EAA | 0.25 mil foil |
| 0.25 mil foil | 2.0 mils EAA |
| Primer | 1.2 mils LDPE |
| 0.5 mil EAA | 10.0 mils Total |
| 2.0 mils LLDPE | |
| 10.0 mils Total | |

| Comp. Ex. A | Comp. Ex. B | Comp. Ex. C |
|---|---|---|
| 2.5 mils LDPE | 2.5 mils LDPE | 1.5 mils LDPE |
| 0.5 mils LDPE | 1.25 mils LDPE | Ink |
| 3.25 mils white LDPE | 2.0 mils PP* | 2.0 mils white LDPE |
| 1.0 mil EAA | 1.5 mil white EAA | 1.6 mils paper |
| 0.25 mil foil | 0.25 mil foil | 0.7 mil LDPE |
| Primer | Primer | 3.3 mils EAA |
| 0.5 mil EAA | 0.5 mil EAA | 0.7 mil foil |
| 2.0 mils LLDPE | 2.0 mils LLDPE | 2.0 mils EAA |
| 10.0 mils Total | 10.0 mils Total | 1.2 mils LDPE |
| | | 13.0 mils Total |

*Uniaxially oriented layer

Portions of the sheet structures of Examples 1, 2 and 3 and comparative Examples A, B and C were made into dispensing tubes in known manner as described in the aforementioned, commonly assigned U.S. Pat. No. 3,540,959. Thus, the tubes were formed by forming a longitudinal lap seam by heat sealing technique to form tubes of 1-11/32 inches in diameter. The tubes were then cut to length and heads were injection molded into one end, inlcuding the use of conventional inserts, and capped. The tubes were filled with product and the ends sealed. The filled tubes were then subjected to testing to demonstrate their desired properties.

DROP TESTS

In a head drop test performed with tubes filled with toothpaste, a tube was dropped on its capped head from a height of 4 feet onto a hard surface. The same tube was repeatedly dropped until it failed, with a maximum of 11 drops per tube, 3 tubes per variable.

In evaluating the tubes according to the drop tests, each drop was counted as one point, and the points for each example were averaged to obtain a representative score for each example. Table 2 shows that tubes made with sheet structures of this invention are physically as strong as tubes from comparative Examples A and B, and much stronger than tubes from comparative Example C.

DEADFOLD TESTS

In using a tube filled with product such a tube of toothpaste, it is desirable to be able to flatten the tube as the product is used, making subsequent dispensing easier. Thus the deadfold characteristics of a tube sheet structure material predict the ability of that tube to stay flat. This characteristic is specifically important when testing the fold on the side of the sheet structure that simulates the fold when a tube is flattened; namely folding onto itself that surface that would form the inside of the tube, such as Layer 32 in FIG. 1.

In performing the deadfold test, a metal weight is used to establish the fold. The metal weight is a rectangular rod 1 inch square and 15 inches long, weighing 4 pounds. Each test specimen of the sheet structure is 4 inches long and 1 inch wide. The strip is placed on a flat surface and bent over across its 1 inch width without creasing it. The weight is then placed squarely and gently across the bent strip so that it folds it down flat and remains squarely on the folded strip. After 30 seconds the weight is removed and the sample is tipped on its edge. 30 seconds after the weight is removed a protractor is used to read the angle. Table 2 shows that deadfold retention for structures of this invention is better than deadfold retention of comparative Examples A and B and, in the case of Example 1 is nearly as good as comparative Example C.

TABLE 2

| Example | Caliper (mils) | Drop Strength | Deadfold Retention |
| --- | --- | --- | --- |
| 1 | 10.0 | 11 | 23° |
| 2 | 10.0 | 10 | 54° |
| 3 | 10.0 | 9 | 34° |
| Comp A | 10.0 | 11 | 104° |
| Comp B | 10.0 | 8 | 76° |
| Comp C | 13.0 | 1 | 22° |

To put the data into perspective, some basic overall comparisons need to be pointed out. The commercial structure of comparative Example C has good deadfold, poor drop strength, and is 30% thicker than the other examples, and is more costly. Comparative Example A and B have good drop strengths and are comparatively less expensive, but have poor deadfold retention. The examples of the invention have good drop strength, are relatively inexpensive, and approach the commercial structure in deadfold characteristics.

As indicated hereinabove the strength and deadfold characteristics of the sheet structure materials of this invention are believed to be attributable to the uniaxial orientation of the PP layer in combination with its proper positioning in the structure. Thus it is anticipated that similar results will be obtained with similar structures wherein only the PP layer is oriented or wherein the PP and the LDPE layer such as Layer 12 in FIG. 1 are oriented.

As it was previously mentioned, the advantages of the present invention will also be realized when the PP layer, or the film substructure of PP, EMA and LDPE (FIG. 1), or their equivalent layers in FIGS. 2 and 3, are oriented in the cross machine direction (CMD). Thus, two tubes of similar dimensions (1-11/32"×7-7/16") from two multi-layer sheet structures, both having layers as shown in FIG. 1 as follows:

EXAMPLE 5

| |
| --- |
| 0.7 mil LDPE* |
| 0.3 mil EMA* |
| 2.0 mils PP* |
| PEI Primer |
| 0.75 mil LDPE |
| 2.75 white LDPE |
| 0.75 mil EAA |
| 0.25 mil foil |
| Polyacrylic Acid Chrome Complex (Primer) |
| 0.5 mil EAA |
| 2.0 mils LLDPE |
| 10.0 mils |

*oriented

The tubes were formed by the method described in the aforementioned U.S. Pat. No.3,540,959. The PP layer in one of the sheet structures was oriented in the MD, and in the other sheet structure, the PP layer was oriented in the CMD. The tubes were filled with Crest BSM toothpaste, headed, including a urea insert, and capped. Five tubes of each type (MD and CMD) were dropped on their heads from a height of four feet. In the case of the MD oriented tubes, all five failed during the first drop, with four tubes failing along the seam, and one failing in the body. In the case of the CMD oriented tubes, four of the five tubes survived 10 drops, but one failed at the seam and head bond on the first drop.

It must be noted that the thickness of the PP layer in the tubes formed in Example 5 was 2.0 mils compared to a thickness of 1.0 mil in Examples 1-4. The increased PP thickness in Example 5 requires better control of the seaming conditions, particularly in case of tubes made with multi-layer sheet structure oriented in the MD. As shown in Example 5, however, increased thickness of PP layer is less disadvantageous in case of CMD oriented tubes.

In general, it is preferable that the thickness of the PP layer be less than about 2 mils, otherwise the seaming conditions during formation of the tubes must be more carefully controlled. Thus, in practice, optimum thickness of the PP layer is about 1 mil.

In the most preferred embodiment of the invention, high density polyethylene may be substituted for polypropylene. This embodiment is illustrated in FIG. 8.

Figure 8:
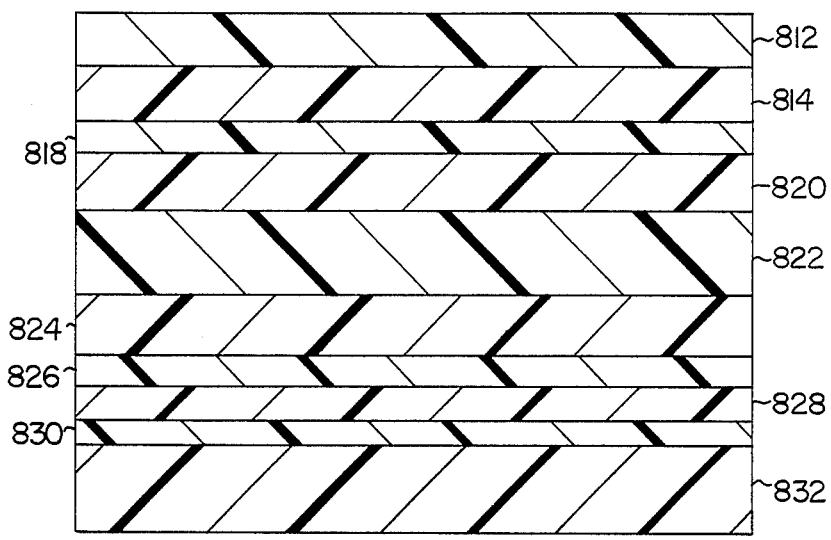
FIG. 8 is another cross-sectional view of a multi layer sheet structure which is the most preferred embodiment of the present invention.
Figure 9:
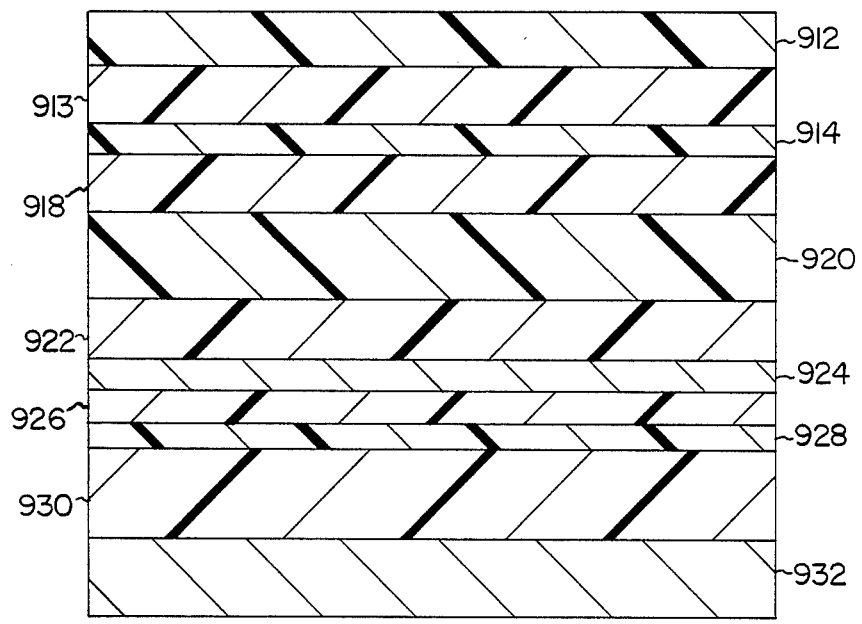

Referring to FIG. 8, the layer 812 is low density polyethylene and layer 814 is high density polyethylene. The remaining layers are as follows: layer 818 is polyethylene imine (PEI) primer; layer 820 is low density polyethylene; layer 822 is pigmented low density polyethylene; layer 824 is ethylene-acrylic acid copolymer layer 826 is aluminum foil; layer 828 is polyacrylic acid chrome complex primer; layer 830 is ethylene-acrylic acid copolymer, and layer 832 is linear low density polyethylene (LLDPE).

It will be noted from FIG. 8 that the structure shown therein is similar to the structure of FIG. 1, except that the polypropylene layer 16 and the ethylene-methyl acrylate layer 14 of the structure of FIG. 1 have been replaced with a single layer of high density polyethylene.

As in the embodiment illustrating the use of uniaxially oriented polypropylene, the high density polyethylene is also uniaxially oriented, either in the machine direction (MD) or in the cross-machine direction (CMD). The sheet structure illustrated in FIG. 8 is otherwise formed in the same manner as hereinbefore described in connection with the other embodiments of this invention.

When using high density polyethylene as in the embodiment shown in FIG. 8, its orientation ratio can be at least about 3/1, and is preferably about 4/1 to about 8/1. Also, the high density polyethylene layer should be placed at about the same distance from the surface as in the case of using polypropylene.

Examples 6 and 7 illustrate a sheet structure having the several layers depicted in FIG. 8.

```
            1.05 mils LDPE
            1.6  mils HDPE
                 PEI Primer
            1.3  mils LDPE
            2.25 mils Pigmented LDPE
            1.1  mils EAA
            0.7  mil foil
    Polyacrylic Acid chrome complex (Primer)
            0.5  mil EAA
            2.0  mils LLDPE
```

EXAMPLE 7

The sheet structure in this example is similar to Example 6 except than an ink layer is interposed on one or both sides of the high density polyethylene layer.

The multi-layer sheet structure shown in Examples 6 and 7 exhibit improved properties similar to the multi-layer sheet structure using uniaxially oriented polypropylene as hereinbefore described.

Those skilled in the art will see certain polymer substitutions which may be made without detracting from the overall performance of the sheet structure, depending on the intended use. The two outer layers of the structure, for example, may be made of other heat sealable polymers, so long as they are compatible for heat sealing purposes. Depending on the polymer selected for the outer layer as at 12, an alternate adhesive polymer may be selected for Layer 14. Also, higher density polyethylene, or ethylene copolymers may, in some cases, be advantageously used instead of LDPE in the interior layers of the sheet structure, as in Layers 20 and 22. Likewise, any graphics, or other ink printing could be done at an alternate layer surfaces.

What is claimed is:

1. A paperless multi-layer sheet structure having two exterior heat sealable layers, comprising, in order:
   (a) a first heat sealable layer on one of said exterior surfaces;
   (b) a first adhesive layer;
   (c) a layer of metal foil;
   (d) a second adhesive layer;
   (e) a layer of polyethylene or ethylene copolymer;
   (f) a layer of uniaxially oriented polymer selected from the group, consisting of polypropylene, polyethylene, ethylene copolymer, polyethylene-polypropylene blend, nylon and polyester having an orientation ratio of about 2/1 to about 6/1; and
   (g) a second heat sealable layer on the second of said exterior surfaces;
   wherein said oriented polymer layer is disposed from about 0.2 to about 4.0 mils from said second exterior surface.

2. A paperless multi-layer sheet structure as in claim 1, wherein the orientation ratio of the oriented polymer is from about 3/1 to about 5/1.

3. A paperless multi-layer sheet structure as in claim 2, wherein said oriented polymer layer is disposed from about 1 to about 1.5 mils from said second exterior surface.

4. A paperless multi-layer sheet structure as in claim 1, wherein said oriented polymer layer is disposed from about 1 to about 1.5 mils from said second exterior surface.

5. A paperless multi-layer sheet structure according to claim 1 wherein said multi-layer sheet structure has a direction of travel during formation and wherein said oriented polymer is oriented parallel to said direction of travel.

6. A paperless multi-layer sheet structure as in claim 5, wherein the orientation ratio of the oriented polymer is from about 3/1 to about 5/1.

7. A paperless multi-layer sheet structure as in claim 6, wherein said oriented polymer layer is disposed from about 1 to about 1.5 mils from said second exterior surface.

8. A paperless multi-layer sheet structure as in claim 5, wherein said oriented polymer layer is disposed from about 1 to about 1.5 mils from said second exterior surface.

9. A paperless multi-layer sheet structure according to claim 1 wherein said multi-layer sheet structure has a direction of travel during formation and wherein said oriented polymer is oriented transverse to said direction of travel.

10. A paperless multi-layer sheet structure as in claim 9, wherein the orientation ration of the oriented polymer is from about 3/1 to about 5/1.

11. A paperless multi-layer sheet structure as in claim 10, wherein said oriented polymer layer is disposed from about 1 to about 1.5 mils from said second exterior surface.

12. A paperless multi-layer sheet structure as in claim 9, wherein said oriented polymer layer is disposed from about 1 to about 1.5 mils from said second exterior surface.

13. A paperless multi-layer sheet structure as in claims 1, 2, 6, 10, 4, 8, 12, 3, 7 or 11, wherein said oriented polymer is made of polypropylene.

14. A paperless multi-layer sheet structure as in claims 1, 2, 6, 10, 4, 8, 12, 3, 7 or 11, wherein said second heat sealable layer is uniaxially oriented.

15. A paperless multi-layer sheet structure as in claims 1, 2, 6, 10, 4, 8, 12, 3, 7 or 11, wherein said second heat sealable layer is heat sealable to said first heat sealable layer.

16. A paperless flexible dispensing tube made of a unitary multi-sheet structure having two exterior heat sealable layers, comprising, consecutively, from the inside to the outside:
   (a) a first heat sealable layer;
   (b) a first adhesive layer;
   (c) a layer of metal foil;
   (d) a second adhesive layer;
   (e) a layer of plyethylene or ethylene copolymer;
   (f) a layer of uniaxially oriented polymer selected from the group consisting of polypropylene, polyethylene, ethylene copolymer, polyethylene-polypropylene blend, nylon and polyester having an orientation ration of about 2/1 to about 6/1; and
   (g) a second heat sealable layer on the second one of said exterior surfaces;
   wherein said uniaxially oriented polymer layer is disposed from about 0.2 to about 4.0 mils from said second exterior surfaces said multi-layer sheet structure being formed into a generally cylindrical shape tube having lap seal between said first and second heat sealable layer.

17. A paperless flexible dispensing tube as in claim 16, wherein the orientation ratio of the oriented polymer is from about 3/1 to about 5/1.

18. A paperless flexible dispensing tube as in claim 17, wherein said oriented polymer is disposed from about 1 to about 1.5 mils from said second exterior surface.

19. A paperless flexible dispensing tube as in claim 16, wherein said oriented polymer layer is disposed from about 1 to about 1.5 mils from said second exterior surface.

20. A paperless flexible dispensing tube as in claim 16 wherein said uniaxially oriented polymer is oriented in a direction substantially parallel to the length of said tube.

21. A paperless flexible dispensing tube as in claim 20, wherein the orientation ratio of the oriented polymer is from about 3/1 to about 5/1.

22. A paperless flexible dispensing tube as in claim 21, wherein said oriented polymer is disposed from about 1 to about 1.5 mils from said second exterior surface.

23. A paperless flexible dispensing tube as in claim 20, wherein said oriented polymer is disposed from about 1 to about 1.5 mils from said second exterior surface.

24. A paperless flexible dispensing tube as in claimed 16 wherein said uniaxially oriented polymer is oriented in a direction substantially parallel to the circumference of said tube.

25. A paperless flexible dispensing tube as in claim 24, wherein the orientation ratio of the oriented polymer is from about 3/1 to about 5/1.

26. A paperless flexible dispensing tube as in claim 25, wherein said oriented polymer is disposed from about 1 to about 1.5 mils from said second exterior surface.

27. A paperless flexible dispensing tube as in claim 24, wherein said oriented polymer is disposed from about 1 to about 1.5 mils from said second exterior surface.

28. A paperless flexible dispensing tube as in claims 16, 17, 21, 25, 19, 23, 27, 18, 22 or 26, wherein said oriented polymer is polypropylene.

29. A paperless flexible dispensing tube as in claims 16, 17, 21, 25, 19, 23, 27, 18, 22 or 26, wherein said second heat sealable layer is uniaxially oriented.

30. A paperless flexible dispensing tube as in claims 16, 17, 21, 25, 19, 23, 27, 18, 22 or 26, wherein said second heat sealable layer is heat sealable to said first heat sealable layer.

31. A paperless laminated sheet structure having multiple layers comprising, in order:
    (a) a first heat sealable layer;
    (b) a first adhesive layer;
    (c) a layer of metal foil;
    (d) a second adhesive layer;
    (e) a layer of polyethylene or ethylene copolymer;
    (f) a layer uniaxially oriented high density polyethylene having an orientation ratio of about 3/1 to about 5/1, and
    (g) a second heat sealable layer.

32. A paperless laminated sheet structure as in claim 31 wherein the orientation ratio of said high density polyethylene is from about 4/1 to about 8/1.

33. A paperless laminated sheet structure as in claim 31 or 32 wherein said first heat sealable layer and said second heat sealable layer is each low density polyethylene.

* * * * *